United States Patent
Bauer et al.

(10) Patent No.: US 9,544,487 B2
(45) Date of Patent: Jan. 10, 2017

(54) CAMERA SYSTEM WITH IMAGE SENSOR CONTACTING METALLIC HOUSING VIA HEAT CONDUCTING ELEMENT

(71) Applicant: Robert Bosch GmbH, Stuttgart (DE)

(72) Inventors: Nikolai Bauer, Moeglingen (DE); Ulrich Seger, Leonberg-Warmbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/650,194

(22) PCT Filed: Oct. 23, 2013

(86) PCT No.: PCT/EP2013/072118
§ 371 (c)(1),
(2) Date: Jun. 5, 2015

(87) PCT Pub. No.: WO2014/090466
PCT Pub. Date: Jun. 19, 2014

(65) Prior Publication Data
US 2015/0312456 A1  Oct. 29, 2015

(30) Foreign Application Priority Data
Dec. 12, 2012 (DE) .......... 10 2012 222 905

(51) Int. Cl.
*H04N 5/225* (2006.01)

(52) U.S. Cl.
CPC .......... *H04N 5/2257* (2013.01); *H04N 5/2251* (2013.01); *H04N 5/2252* (2013.01); *H04N 5/2253* (2013.01); *H04N 5/2254* (2013.01)

(58) Field of Classification Search
CPC .................................... H04N 5/2252
USPC .................................... 348/374, 373
See application file for complete search history.

(56) References Cited

U.S. PATENT DOCUMENTS

| | | |
|---|---|---|
| 2006/0056049 A1 | 3/2006 | Tokiwa et al. |
| 2008/0156509 A1 | 7/2008 | Ikeo |
| 2009/0115891 A1* | 5/2009 | Ryu .............. H04N 5/2253 348/374 |
| 2011/0155453 A1 | 6/2011 | Kawai et al. |

FOREIGN PATENT DOCUMENTS

| | | |
|---|---|---|
| DE | 10 2009 027 514 | 1/2011 |
| WO | WO 03/105465 | 12/2003 |

OTHER PUBLICATIONS

International Search Report for PCT/EP2013/072118, dated Jan. 23, 2014.

* cited by examiner

*Primary Examiner* — Joel Fosselman
(74) *Attorney, Agent, or Firm* — Norton Rose Fulbright US LLP; Gerard Messina

(57) ABSTRACT

A camera system for a vehicle includes: a camera housing; an imager module accommodated in the camera housing, the imager module including a carrier device, a lens accommodated in the carrier device, and an image sensor accommodated at the carrier device, an optical axis of the camera system being set by the image sensor and the lens. The image sensor makes contact with a metallic housing part of the camera housing via a heat-conducting element. The imager module is fixed in one direction perpendicular to the optical axis in the camera housing, i.e., it is braced in the radial direction and cooled axially toward the rear.

11 Claims, 4 Drawing Sheets

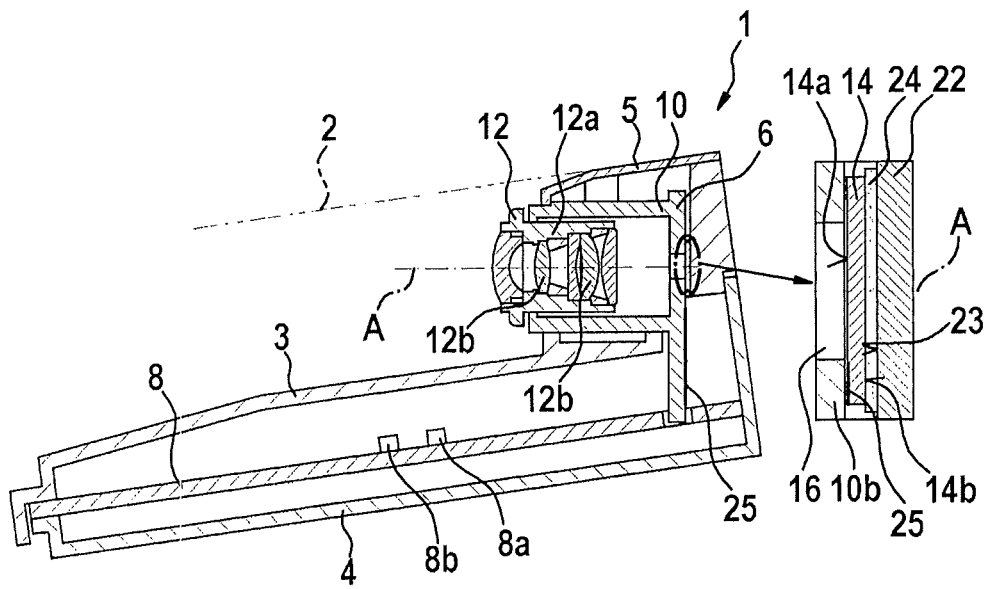
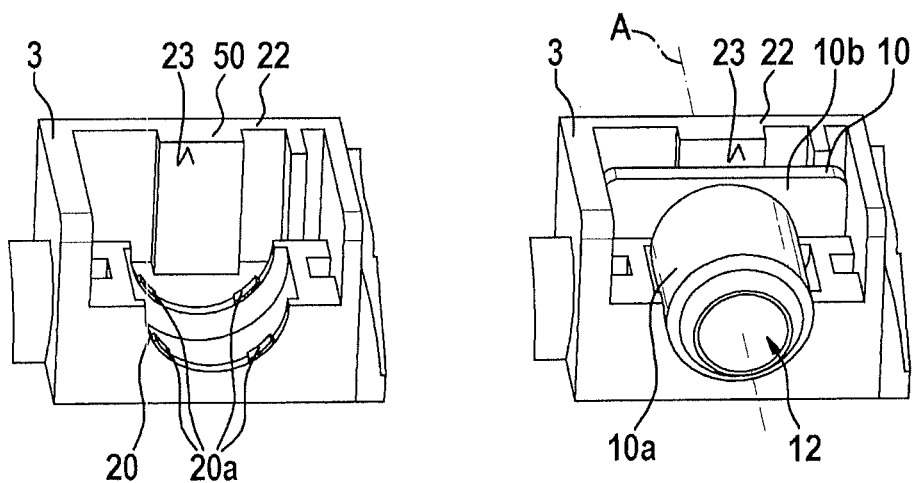

CAMERA SYSTEM WITH IMAGE SENSOR CONTACTING METALLIC HOUSING VIA HEAT CONDUCTING ELEMENT

BACKGROUND OF THE INVENTION

1. Field of the Invention

The present invention relates to a camera system, which is in particular usable in a vehicle, as well as to a method for manufacturing the camera system.

2. Description of the Related Art

Camera systems are used in vehicles in particular for the detection of a roadway area ahead of the vehicle. The camera systems are generally designed here as a camera module including an external camera housing which accommodates a lens, an image sensor, and generally a circuit carrier including additional electronic elements.

The design of an imager module including a lens, a lens holder, a sensor carrier and an image sensor mounted on the sensor is known. The lens holder may, for example, be screwed to the sensor carrier. This imager module is subsequently installed in the camera housing and the sensor carrier makes contact with, for example, a circuit carrier.

In fixed-focus systems, the imager module is adjusted during its manufacture by adjusting the lens in the lens holder along the optical axis by analyzing image signals of the image sensor, for example by a test pattern being detected within a relevant distance whose image is then analyzed for contrast. Published German patent application document DE 10 2009 0275 14 A1 shows such a camera system in which the lens is fixed in the lens holder using an adhesive after the adjustment.

Furthermore, MID (Molded Interconnect Devices) circuit carriers are generally known in which metallic printed conductors for electrical connections are applied directly on, for example, molded plastic carriers. In this way, electrical circuits may be implemented on spatially more complex structures, the structures also being able to simultaneously assume mechanical functions without additional parts needing to be patched on. In this way, a high mechanical strength is achieved.

BRIEF SUMMARY OF THE INVENTION

According to the present invention, the image sensor makes contact via a heat-conducting means with a metallic housing part of the camera housing. A housing part is in particular meant to be understood here as a part which is fixedly connected to additional parts of the camera housing. The metallic housing part advantageously includes an outer surface of the camera housing, via which heat may thus be dissipated.

The heat-conducting means is in particular flexible or elastic. The contact preferably takes place via the back side of the image sensor, at the front side of which its sensitive surface is implemented. The contact is tension-free in particular in the axial direction. Thus an elastic, flexible heat-conducting means may be used which enables a large-scale contact with the back side of the image sensor. The direct heat dissipation to a metallic housing part enables here a very efficient cooling and heat dissipation to the exterior.

According to a particularly preferred embodiment, the imager module is fixed or attached on the camera housing in a direction perpendicular to the optical axis. This accommodation is preferably carried out by bracing so that the imager module is pressed against a first housing part of the camera housing in a direction perpendicular to the optical axis. A carrier device of the imager module, which accommodates the lens and the image sensor, is advantageously braced against the housing part.

In this way, multiple advantages are already achieved:

The fixing acts perpendicularly to the optical axis in a particular way together with the cooling via a heat-conducting means to the metallic housing part in the direction of the optical axis toward the back. By carrying out the fixing perpendicular to the optical axis, the cooling contact may be carried out tension-free along the optical axis toward the back so that the image sensor is not subjected to load through tensions and the—in particular flexible—heat-conducting means may make effective and large-scale contact.

The first housing part may in particular include a contact contour here for a self-centering accommodation of the imager module. In this way, a spring device may press the imager module against this accommodation contour of the first housing part from one side in such a way that the imager module is positioned in a self-centering manner. In this way, the fixing is used perpendicularly to the axial direction, i.e., in the radial direction, also for self-centering.

The carrier device is pressed against the contact contour in particular together with its lens holder, which is advantageously designed cylindrically and which accommodates the lens. An effective self-centering is achieved in particular using a V-shaped accommodation contour, i.e., with contour areas inclined toward one another, which together form a V shape. Advantageously, four corresponding contour areas are provided, respectively two contour areas forming a V and two such protruding designs being provided consecutively in the axial direction so that a self-centering is achieved perpendicularly to the optical axis and a tilting is prevented by the two V shapes.

According to a particularly advantageous embodiment, the carrier device is designed as one piece, in particular as an MID injection molded part. The strength is improved by the one-piece design in order to accommodate the entire carrier device in the self-centering contour without adjusting the optical axis. In a design as an MID molded part, the printed conductors may also be designed for the image sensor to make contact in the MID carrier device. Here it is recognized that a shaping is possible in which the cylindrical lens holder and the essentially plate-shaped sensor carrier may be designed as one single injection molded part, in particular having an injection molding direction along the optical axis. A contacting may in particular take place with a circuit carrier provided below.

The metallic housing part, which serves as a heat sink for the image sensor, is advantageously implemented by the first housing part itself, which includes the accommodation contour. In this way, the imager module is pressed against the first housing part at which the image sensor is also cooled. A stable, secure accommodation results.

The bracing may be carried out in particular in the vertical direction. In this way, the imager module is placed from above or from below into the metallic first housing part and pressed by a spring element against its accommodation contour. The spring element may also be a housing part itself, for example, a top cover; furthermore, a spring element may be put between a housing part and the imager module. The additional housing part may be locked in place, for example, clipped, to the first housing part, for example, in a form-locked manner.

According to the present invention, additional advantages are thus achieved:

A rapid, safe and thus also cost-effective manufacture is possible involving few components and few work steps.

Since the accommodation of the imager module in the camera housing is carried out safely and in a self-centering manner without bracing the imager module along the optical axis, distortions and defocusings due to bracing may be avoided along the optical axis. Due to the direct cooling of the image sensor, in particular via its back side, and a flexible heat-conducting means, for example a heat-conducting paste or a flexible heat-conducting pad directly at a metallic housing part, a very good cooling performance may be achieved so that the good imaging characteristics of the image sensor or less noise may be achieved.

BRIEF DESCRIPTION OF THE DRAWINGS

FIG. 1 shows a camera system according to one specific embodiment of the present invention in the longitudinal section along the optical axis.

FIG. 2 shows a perspective view from the front and from above of a section of the metallic first housing part from FIG. 1 without and including the installed imager module.

DETAILED DESCRIPTION OF THE INVENTION

Figure 3:
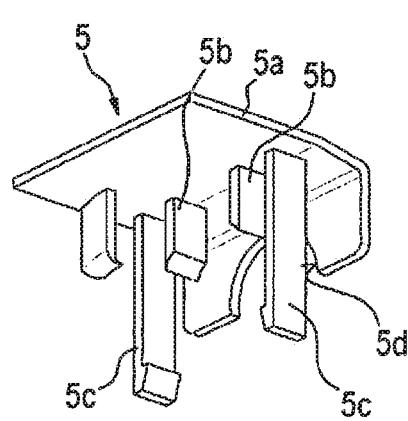
FIG. 3 shows the spring element in the perspective view from below.
Figure 4:
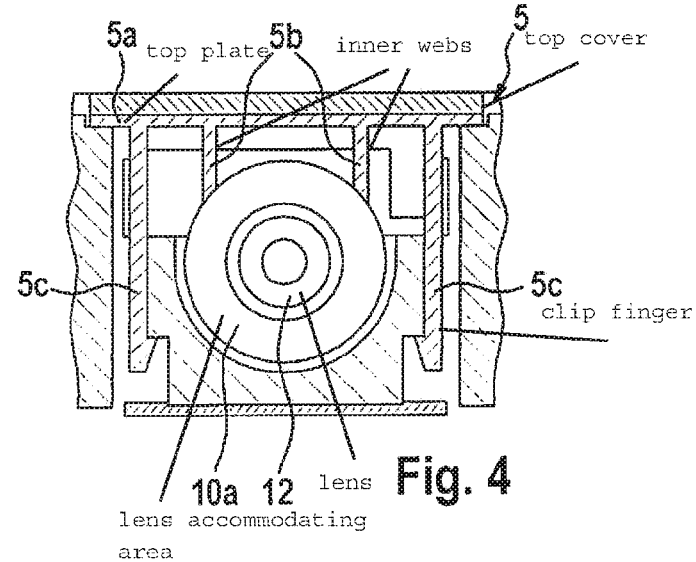
FIG. 4 shows a sectional view perpendicular to the optical axis.

A camera system 1 shown in FIGS. 1 through 4 is provided in particular for installation in a vehicle 2, not shown in detail, in particular for the detection of an exterior space through a vehicle window of vehicle 2. Camera system 1 includes a camera housing 3, 4, 5 including a first housing part 3 manufactured as a cast part from a metal, in particular aluminum, a second housing part 4 serving as a lower cover, and an upper cover 5. Furthermore, camera system 1 includes an imager module 6 and a circuit carrier 8, which are accommodated in camera housing 3, 4, 5. Imager module 6 is designed as an assembly which includes a carrier device 10 manufactured using MID (Molded Interconnect Device)-technology, a lens 12 accommodated in MID carrier device 10, and an image sensor 14 (imager chip) attached at MID carrier device 10. An optical axis A is defined by lens 12 and image sensor 14.

MID carrier device 10 is manufactured as an injection molded part from a suitable plastic or mold material and includes an essentially cylindrical lens accommodating area 10a for accommodating lens 12 and a plate-shaped sensor carrier area 10b, adjacent to the back side of lens accommodating area 10a, at the back side of which image sensor 14 is attached. Here lens 12 is preferably in MID carrier device 10 [and is] initially longitudinally adjustable for focusing the optical system of lens 12 and image sensor 14 during the manufacture of imager module 6 with subsequent fixing. Camera system 1 is thus preferably a fixed-focus camera system having a fixed object distance, for example, an infinite object distance for the detection of an exterior space outside of vehicle 2. Lens 12 includes, in a way known per se, a lens mount 12a and lenses 12b. The fixing of lens 12 in lens accommodating area 10a or its cylindrical inner surface is possible with the aid of, for example, an adhesive, for example, a UV cured adhesive in UV transparent plastic material of carrier device 10 or also by friction welding, for example by a friction contact.

Sensor carrier area 10b has a recess 16, through which optical axis A runs, image sensor 14 being attached at the back side of plate-shaped sensor carrier area 10b and being oriented through recess 16 toward lens 12; image sensor 14 is thus attached using flip-chip technology to lens 12 with its sensitive surface being oriented through recess 16. Thus sensitive surface 14a of image sensor 14 is protected against the exterior space. Both image sensor 14 as well as lens 12 are thus attached at a shared, one-part MID carrier device 10, so that no additional tolerances occur between them.

Imager module 6 is inserted into camera housing 3, 4, 5 and accommodated spring pretensioned. For this purpose, the metallic first housing part 3 includes a shaping apparent from FIG. 2 including a contact contour 20 which is described by, for example, four contour areas 20a of which two contour areas 20a respectively are positioned in the same plane perpendicularly to optical axis A and run toward one another in a V shape, i.e., run down toward one another. The two pairs of contour areas 20a, situated in a V-shape, are offset along optical axis A, which eliminates the tilting risk of imager module 6.

During installation, the cylindrical lens accommodating area 10a makes contact from above on contact contour 20 according to the diagram on the right in FIG. 2; a self-centering accommodation is thus formed. Metallic housing part 3 includes a housing back wall 22, to which back side 14b of image sensor 14 is attached with the aid of a heat-conducting means, in particular a heat-conducting paste 24. This attachment with the aid of heat-conducting paste 24 or also a flexible heat-conducting pad, for example, is carried out tension-free and does not serve for the fixing but rather only for the cooling of image sensor 14 via its back side 14b at a heat contacting area 23 of metallic first housing part 3. The top cover 5 shown in FIG. 3 is placed on top of the system shown in FIG. 2, a fixing of imager module 6 being carried out via a spring element acting from above; in this specific embodiment, the top cover 5 is itself designed as a spring element, i.e., the spring element is integrated into top cover 5; alternatively, it may also be placed between top cover 5 and lens accommodating area 10a of the carrier device. The fixing of imager module 6 is thus carried out perpendicularly to optical axis A; in the shown specific embodiment, this fixing is carried out in the vertical direction, by pressing the top cover of imager module 5 downward into accommodation contour 20.

Top cover 5 is advantageously secured at metallic first housing part 3 by locking or clipping and its rear end area makes contact with metallic first housing part 3. According to the shown embodiment it is designed as an injection molded plastic part, including a top plate 5a, which forms the end toward the top and makes contact at its rear (shown in FIG. 3 at the front) end with first metallic housing part 3, furthermore inner webs 5b, which, according to FIG. 4, make contact with lens accommodating area 10a, and press it vertically downward, outer clip fingers 5c which grasp around metallic first housing part 3, and a contact area 5d which in turn makes contact with lens accommodating area 10a; the contact area 5d and its inner webs 5b of clip spring element serving as top cover 5 thus make contact with lens accommodating area 10a and press it vertically upward; using clip fingers 5c it grasps around metallic first housing part 3. As was already described above, the additional attachment of a spring element between the cover fixed on housing part 3, for example, grasping around it, and lens accommodating area 10a, is also possible.

On circuit carrier 8, additional components 8a, 8b are provided in a manner known per se for the signal processing of the image signals of image sensor 14 and, for example, for connecting to an on-board vehicle data network. Image sensor 14 makes contact with circuit carrier 8, this contact taking place via printed conductors 25 of MID carrier device 10 which runs vertically to circuit carrier 8.

Figure 8:
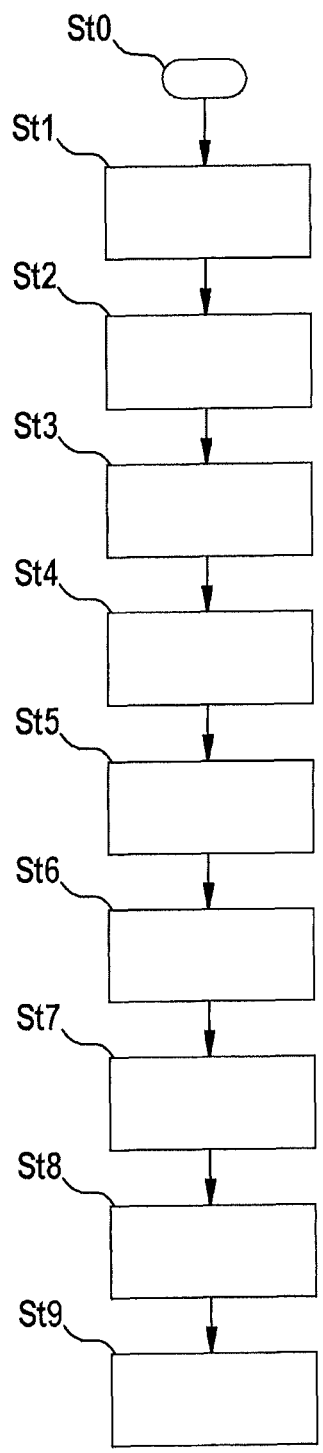
FIG. 8 shows a flow chart of a manufacturing method of the camera system from FIGS. 1 through 4.

For the manufacture, imager module 6 is initially produced after the start in step St0, by mounting image sensor 14 in St1 of FIG. 8 to the back side of carrier device 10 using flip-chip technology and making contact with printed conductors 25 (the contacting may also take place subsequently.) Subsequently, in step St2, lens 12 is installed in lens accommodating area 10a of MID carrier device 10; a focusing of the optical system may be carried out subsequently in step St3 by longitudinally adjusting lens 12 and analyzing image signals of image sensor 14 with which, in a manner known per se, a test pattern is detected and analyzed for a maximum contrast. Imager module 6 completed in step St4 by fixing lens 12 in lens accommodating area 10a is subsequently installed in step St5 from above in metallic first housing part 3, during which lens accommodating area 10a makes contact with contact contour 20, it being possible for, for example, for heat-conducting paste 24 to already have been applied to the back side of image sensor 14a so that the thermal attachment takes place; furthermore, the heat-conducting paste may also be introduced subsequently in step St6 into the gap between back side 14b of image sensor 14 and housing back wall 22 of first housing part 3. Then in step St7, top cover 5 serving as the spring element is installed from above, or a spring means is placed on top and top cover 5 is then placed on top which clips into first housing part 3, the self-centering accommodation of imager module 6 being guaranteed. Subsequently, the contacting of printed conductors 25 with circuit carrier 8 may take place in step St8, and camera system 1 may be completed in step St9 by placing the lower, second housing part 4 from below. The thus designed camera system 1 may therefore be attached in the vehicle using, for example, an additional camera mount at the vehicle windshield or, for example, also in the area of the roofing of the vehicle or at a rear-view mirror mount.

Figure 5:
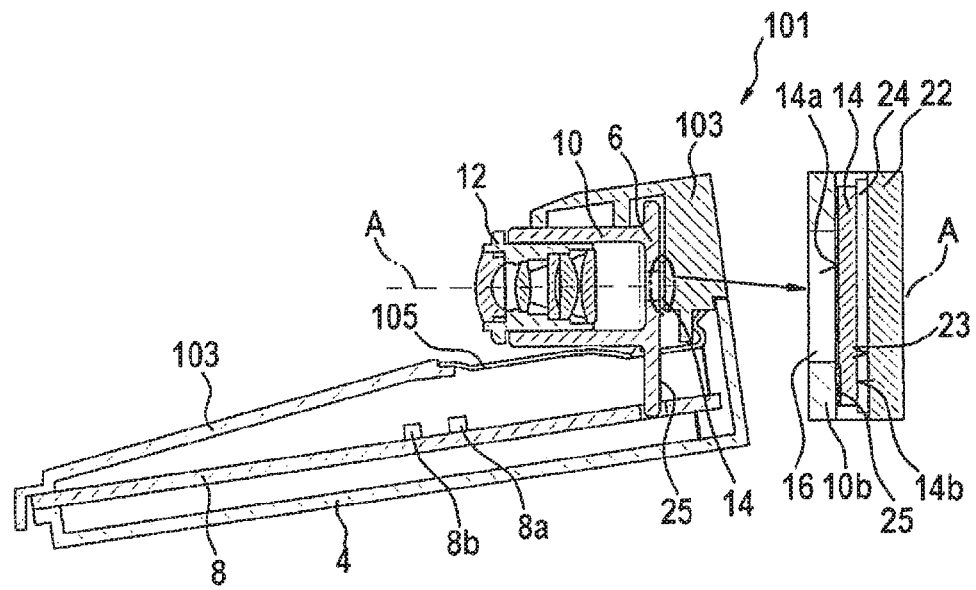
FIG. 5 shows an alternative, additional specific embodiment to FIG. 1 of the camera system.
Figure 6:
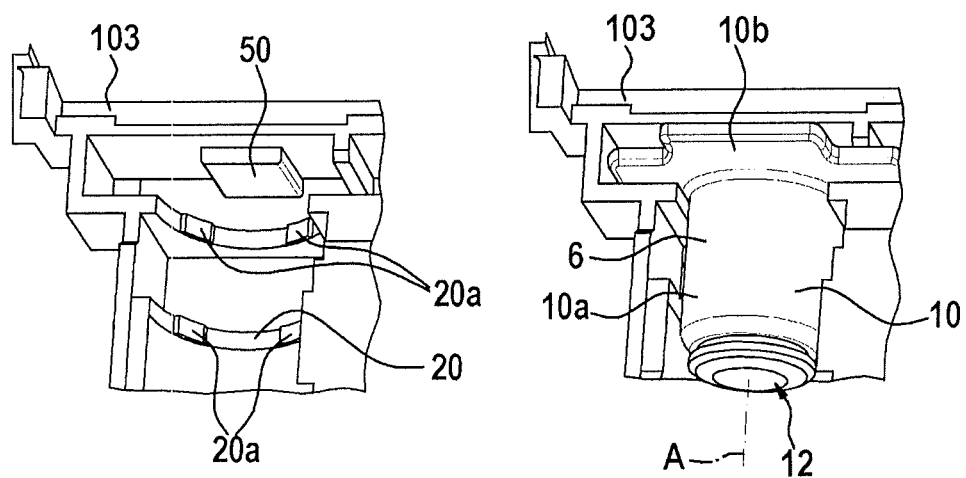
FIG. 6 shows a slightly perspective bottom view of a section of the metallic first housing part from FIG. 5 without and including the installed imager module.
Figure 7:
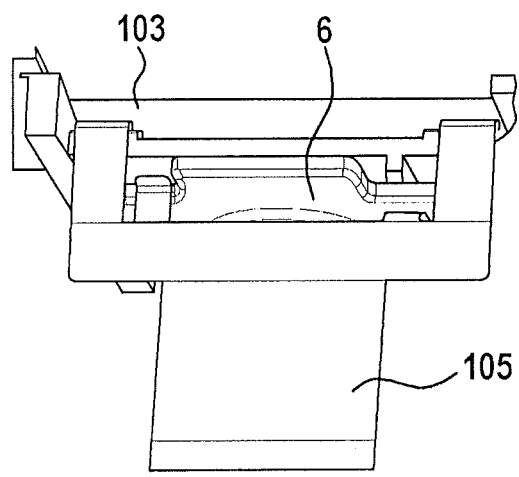
FIG. 7 shows the step of installing the spring element following FIG. 6.

FIGS. 5 through 7 show another specific embodiment of a camera system 101 in which the metallic housing part 103 serves as the top housing part; the otherwise unchanged imager module 6 is thus inserted from below into the metallic first housing part 103, i.e., also perpendicularly to optical axis A, a spring element 105 correspondingly pressing from below against imager module 6, in particular its cylindrical lens accommodating area 10a. According to this embodiment, spring element 105 may be accommodated directly in a recess of metallic first housing part 103, for example, as a curved metal plate. FIG. 7 shows spring element 105 which may be suspended or clipped as a metal plate or sheet and which presses upward from below in the second specific embodiment.

Furthermore, embodiments in which imager module 6 is inserted from the side and braced are also possible.

The spring tensions of spring element 5 or 105 are in this case so low that they are low compared to the strength or the elasticity module of lens accommodating area 10a of MID carrier device 10 of imager module 6; carrier device 10 and its lens accommodating area 10a are thus not deformed so that the optical characteristics of imager module 6 are not adversely affected by this fixing. This may take place with a sufficiently thick design of the wall thickness, in particular of lens accommodating area 10a and also of plate-shaped sensor carrier area 10b.

In both specific embodiments a secure installation takes place of cylindrical lens accommodating area 10a, in which contact contour 20 includes four contour areas 20a which are positioned in a V shape, two V shapes thus being positioned consecutively in the axial direction in order to prevent a tilting of lens accommodating area 10a and thus of accommodated lens 12. Accordingly, first housing part 3 or 103 is respectively designed with, for example, two parallel wall areas 25 or 125 which, for example, re-create the semicircular shape of lens accommodating area 10a. However, the placement on the four contact areas of contact contour 20 and their V shape for the self-centering of imager module 6 is relevant.

At the housing back wall 22 or 122 a projection 50 may, if necessary, be provided for forming heat contacting area 23 for making contact with heat-conducting means 24. In principle, this is not necessary. As previously stated, there is no fixing or bracing in the axial direction.

What is claimed is:

1. A camera system for a vehicle, comprising:
   a camera housing; and
   an imager module accommodated in the camera housing, the imager module including a carrier device, a lens accommodated in the carrier device, and an image sensor accommodated at the carrier device, wherein an optical axis of the camera system is set by the image sensor and the lens, and wherein the image sensor makes contact via a heat-conducting element with a metallic housing part of the camera housing;
   wherein at one first housing part a self-centering contact contour is formed and the imager module is pressed against the contact contour by a spring element for self-centering accommodation in the camera housing.

2. The camera system as recited in claim 1, wherein the contact contour includes contour areas which are positioned in a V shape, and the carrier device is accommodated in the contact contour with the lens accommodating area accommodating the lens.

3. The camera system as recited in claim 2, wherein respectively two front and two rear contour areas extend toward one another in a V shape, and the front and the rear contour areas are spaced apart from one another in the direction of the optical axis for self-centering accommodation and support of the imager module against tilting.

4. The camera system as recited in claim 1, wherein the spring element is one of (i) configured as a top cover, or (ii) provided between the imager module and the top cover, and the top cover is attached at the first housing part.

5. The camera system as recited in claim 1, wherein the first housing part including the contact contour includes a heat contacting area for making contact with the heat-conducting element.

6. The camera system as recited in claim 1, wherein the imager module is vertically contacted with the contact contour, and the imager module is inserted from one of below or above into the contact contour.

7. The camera system as recited in claim 1, wherein the carrier device accommodating the image sensor and the lens is configured as one piece.

8. The camera system as recited in claim 7, wherein the carrier device is configured as a one-piece injection molded part, and printed conductors are formed one of in or on the carrier device for making contact with the image sensor.

9. The camera system as recited in claim 1, wherein the camera housing includes the metallic housing part and a second housing part, the metallic housing part being a metal cast part, and a circuit carrier is accommodated between the first housing part and a second housing part for contacting with the image sensor and accommodating additional components.

10. The camera system as recited in claim 1, wherein the heat-conducting element is one of a heat-conducting paste or a flexible heat-conducting pad.

11. The camera system as recited in claim 10, wherein the image sensor has a front side with a sensitive surface and a back side which makes tension-free contact via the heat-conducting element with the metallic housing part.

\* \* \* \* \*